(12) United States Patent
Barman et al.

(10) Patent No.: US 7,337,344 B2
(45) Date of Patent: Feb. 26, 2008

(54) METHODS AND APPARATUS FOR SYNCHRONIZING DEVICES ON DIFFERENT SERIAL DATA BUSES

(75) Inventors: Roderick A. Barman, Vancouver (CA); Stewart J. Kingdon, Vancouver (CA); Timothy D. Vlaar, North Vancouver (CA)

(73) Assignee: Point Grey Research Inc., Vancouver (CA)

( * ) Notice: Subject to any disclaimer, the term of this patent is extended or adjusted under 35 U.S.C. 154(b) by 433 days.

(21) Appl. No.: 10/766,852

(22) Filed: Jan. 30, 2004

(65) Prior Publication Data
US 2004/0187044 A1   Sep. 23, 2004

Related U.S. Application Data

(60) Provisional application No. 60/443,854, filed on Jan. 31, 2003.

(51) Int. Cl.
*G06F 1/12* (2006.01)
(52) U.S. Cl. ........................................ 713/400; 713/375
(58) Field of Classification Search ................ 713/400, 713/375
See application file for complete search history.

(56) References Cited

U.S. PATENT DOCUMENTS

| | | | | |
|---|---|---|---|---|
| 4,807,259 A * | 2/1989 | Yamanaka et al. | .......... | 375/358 |
| 6,081,324 A * | 6/2000 | Yagita et al. | ............ | 356/237.1 |
| 6,650,719 B1 * | 11/2003 | Baker | .......................... | 375/371 |
| 6,766,407 B1 * | 7/2004 | Lisitsa et al. | ................ | 710/316 |
| 2002/0152420 A1 * | 10/2002 | Chaudhry et al. | ............ | 714/11 |

OTHER PUBLICATIONS

Point Grey Research, 'IEEE-1394 digital camera', 2001.

* cited by examiner

*Primary Examiner*—Rehana Perveen
*Assistant Examiner*—Tse Chen
(74) *Attorney, Agent, or Firm*—Oyen Wiggs Green & Mutala LLP

(57) ABSTRACT

The invention provides a method of synchronizing one or more devices on a first bus with one or more devices on a second bus. The method comprises acquiring timing information from the first bus and the second bus, determining a timing offset between the first bus and the second bus, and, broadcasting the timing offset to the one or more devices on the second bus so that the one or more devices on the second bus can adjust their timing to be synchronized with the one or more devices on the first bus.

26 Claims, 7 Drawing Sheets

METHODS AND APPARATUS FOR SYNCHRONIZING DEVICES ON DIFFERENT SERIAL DATA BUSES

TECHNICAL FIELD

The invention relates to synchronizing the operations of two or more devices which are connected to different data buses. The invention has particular application to digital imaging. The invention may be applied to synchronizing two or more digital cameras which are located on different data buses.

BACKGROUND

There are many applications for digital cameras which are interfaced to computers. A digital camera typically operates by acquiring a series of images from a suitable imaging array. In some applications it is desirable to operate two or more digital cameras in a synchronized manner so that the video cameras acquire images substantially simultaneously. For example, when using two cameras to acquire stereo images of moving objects, the positions of the objects can be more accurately ascertained if both cameras acquire images at the same time.

The resolution of video cameras is improving. With other factors equal, higher resolution cameras produce more data than do lower resolution video cameras. The sheer volume of data produced by multiple high resolution video cameras is beyond the capacity of many current high-speed data buses of types which it is convenient to use in interconnecting video cameras and data processing devices. This forces designers of systems which require multiple video cameras to either distribute the video cameras across multiple buses or live with one or more of: lower resolution images, lower frame rates, or expensive proprietary interfaces.

One could interconnect the cameras directly on a separate wiring system which carries a synchronization signal but this is inconvenient, and it also makes it difficult to achieve proper overlap of acquisition and transmission of frames because the time at which integration will occur is not known. Further, especially in factories or other electrically noisy environments such systems can be susceptible to picking up electrical noise.

Where digital cameras are distributed across multiple buses there is the difficulty that for certain applications it is necessary to maintain the cameras operating synchronously with one another. In various applications other types of time-sensitive devices such as sound recorders, video displays, and other data acquisition or output devices need to be operated in synchrony with one another.

There is a need for ways to synchronize cameras and other time-sensitive devices which are on different buses.

SUMMARY OF THE INVENTION

This invention synchronizes the operation of time sensitive devices such as video cameras, video displays, audio recording devices, audio playback devices, or other data acquisition or output devices operating on separate buses. One aspect of the invention provides a method which determines differences between timing signals on a first bus chosen to be used as a "master" bus and one or more second buses which can be considered to be "slave" buses. The method then generates and sends to devices on each of the one or more slave buses timing signals which indicate offsets and/or relative drifts between the timing of the master and slave buses. The devices on the slave buses can use the timing signals to adjust their operation so that time sensitive events occur as if all of the devices were connected to the master bus. Another aspect of the invention provides a method wherein a separate clock, which could be a clock of a separate bus without any of the devices thereon, is designated as the master clock, with all of the devices connected to slave buses.

Another aspect of the invention provides a system which includes a plurality of buses each connecting one or more devices to a data processor and a mechanism for synchronizing the operation of the devices.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
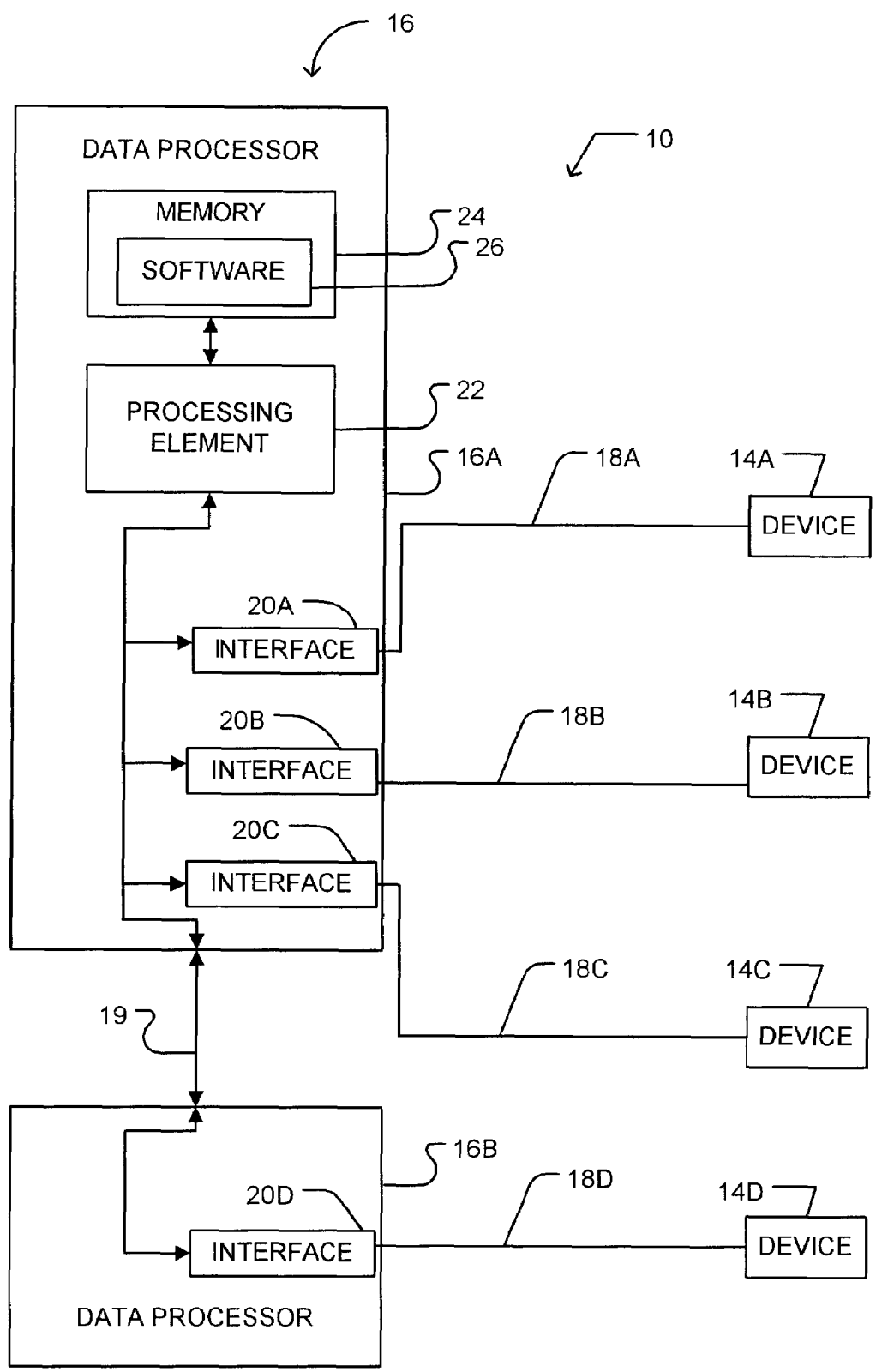
FIG. 1 is a block diagram illustrating apparatus according to one embodiment of the invention.

FIG. 1 shows apparatus 10 according to one embodiment of the invention. Apparatus 10 comprises four devices 14A, 14B, 14C, and 14D (collectively devices 14). Devices 14 may, for example, comprise video cameras, video displays, audio recording devices, audio playback devices, or other data acquisition or output devices. Devices 14 each generate data (video data in the case that devices 14 are digital video cameras) which is carried to a data processor 16 on a corresponding bus 18A, 18B, 18C or 18D (collectively buses 18). Data processor 16 may comprise a single element, or may comprise data processors 16A and 16B, as illustrated in FIG. 1. Buses 18 may comprise any suitable bus technology. For example, buses 18 may operate according to the IEEE 1394 standard (also known as FIREWIRE™ or iLink™). Alternatively, each of buses 18 may comprise a different type of bus operating according to a different standard. Buses 18 provide timing signals for use by devices 14 connected to buses 18. In some embodiments buses 18 are each of a type which automatically broadcasts timing signals to devices 14.

Buses 18A, 18B, and 18C each connect to data processor 16A by way of a corresponding one of hardware/software interfaces 20A, 20B and 20C. Bus 18D is connected to data processor 16B by way of an interface 20D. Interfaces 20A through 20D are referred collectively herein as interfaces 20. Each interface 20 may comprise a clock for generating bus timing information for the corresponding bus 18. Data processor 16A can receive data from or transmit data to device 14D by way of a network connection 19 which directly or indirectly connects data processor 16A to data processor 16B. In a typical implementation of the invention, each of data processors 16A and 16B comprises a personal computer.

Data processor 16 comprises at least one processing element 22 which has access to a program memory 24. Memory 24 contains software instructions 26 which, when executed, cause processing element 22 to generate synchronization timing information used to synchronize devices 14 on different buses 18 in a method according to one embodiment of the invention.

One of buses 18, in this instance bus 18A, is designated as a master bus. The choice of which bus 18 to designate as a master is arbitrary. Software instructions 26 causes processing element 22 to determine a time offset between the timing of master bus 18A and the timing of each of "slave" buses 18B and 18C. This may be done, for example, by retrieving timing information from the interface 20 corresponding to each bus 18. Devices on bus 18D, which is connected to a different computer, can also be synchronized. Software 26 can cause data processor 16A to retrieve timing information for bus 18D by way of network connection 19. Software running on data processor 16B may be provided to retrieve timing information for bus 18D by means of interface 20D upon a request received from data processor 16A and to send the timing information to data processor 16A by way of network connection 19.

To obtain accurate measurements of the timing offset between first and second buses, it is desirable to average over a number of measurements. For example, software 26 could cause processing element 22 to read timing information for a first one of the buses 18, read timing information for the second one of buses 18, read the timing information again for the first one of buses 18 and then subtract the timing information for the second one of buses 18 from an average of the two readings of timing information for the first one of buses 18, to obtain an offset between the timing of the first and second buses.

For each one of the buses 18 which is considered a "slave," software 26 can cause the time offset information for that bus to be sent periodically to any devices 14 on that bus. Timing control systems in each of devices 14 can use the offset information to adjust their timing to be synchronized with any devices 14 on master bus 18A. Some ways in which timing control systems can operate in specific devices are described below.

In general, the time offset between two buses 18 which have independent clocks will not stay constant but will drift. This can be corrected for by computing the difference between subsequent measurements of the time offset and computing the rate of drift from the difference and the time between the measurements. In some embodiments of the invention software 26 causes both the time offset for each slave bus and a rate of drift in the time offset for the slave bus to be transmitted to each device 14 on that slave bus.

The rate of drift described above is a reasonably close approximation to the first derivative of the time offset with time. Where three or more measurements of the time offset are available for a slave bus 18, software 26 may compute a better approximation of the first derivative of the time offset with respect to time and/or, may compute approximations to higher derivatives of the time offset with respect to time. Software 26 may cause such first and higher derivatives to be transmitted to devices 14 on the corresponding slave bus 18.

Figure 2:
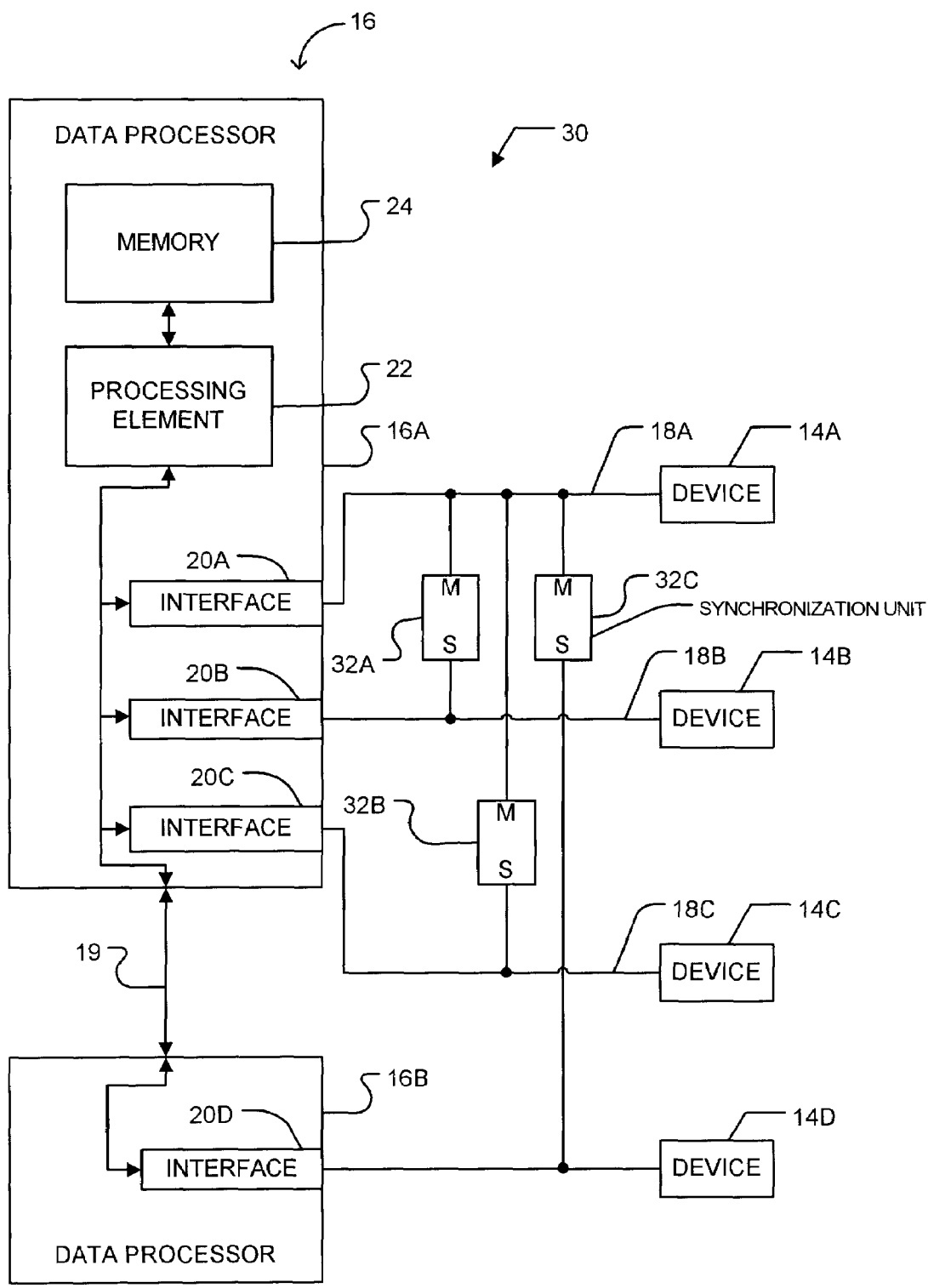
FIG. 2 is a block diagram illustrating apparatus according to another embodiment of the invention.
Figure 4:
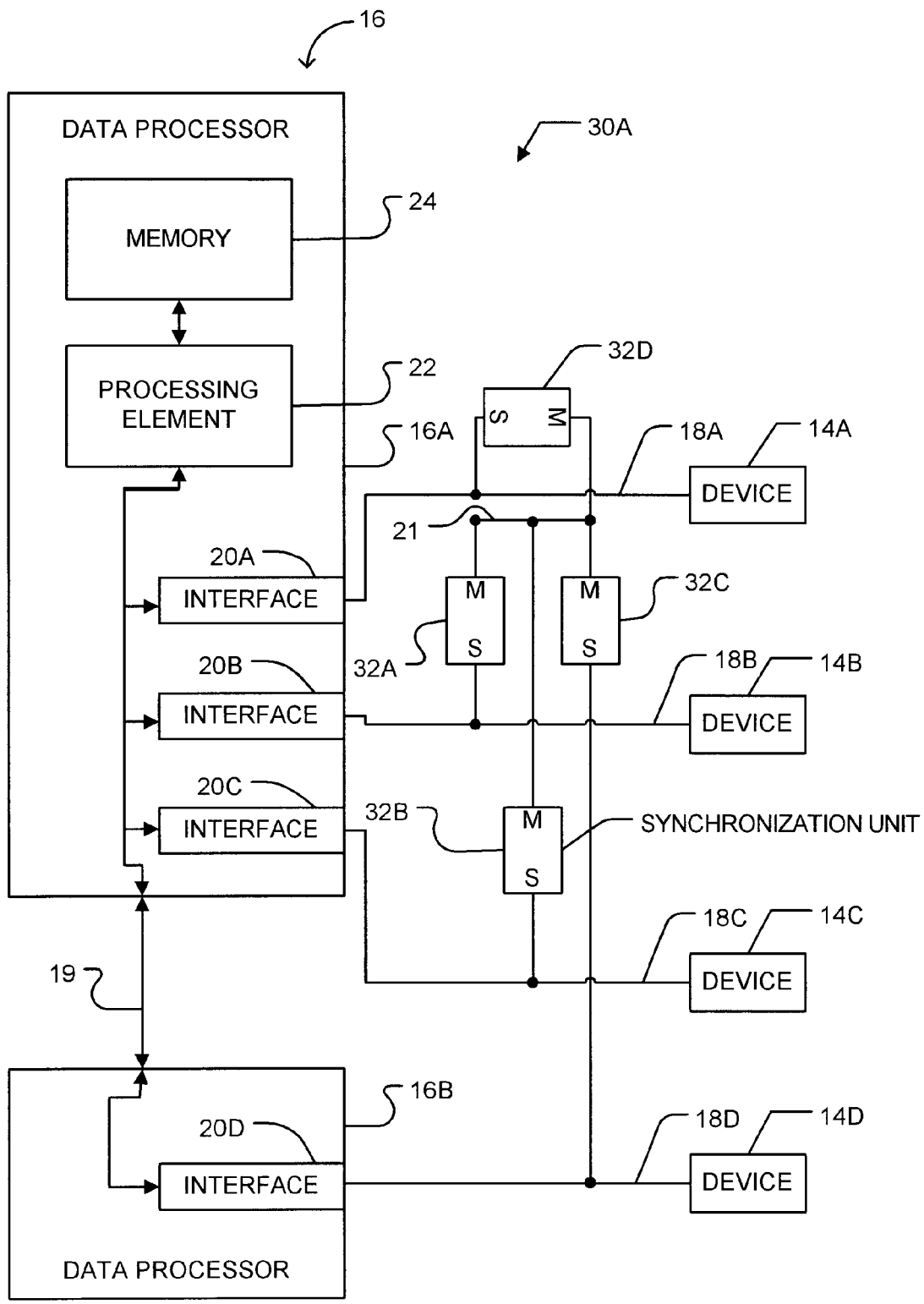
FIG. 4 is a block diagram illustrating an apparatus according to another embodiment of the invention.

FIG. 2 illustrates apparatus 30 according to another embodiment of the invention. Components of apparatus 30 which are common with apparatus 10 are given the same reference numerals. Apparatus 30 differs from apparatus 10 in the provision of synchronization units 32A, 32B and 32C (collectively synchronization units 32) and in the fact that software 26 is not required. In the embodiment of FIGS. 2 and 4, network connection 19 is not required for synchronization of devices 14 although it may be required for the purpose of delivering to data processor 16A data from a device 14 on a bus 18 which is connected to data processor 16B.

Figure 3:
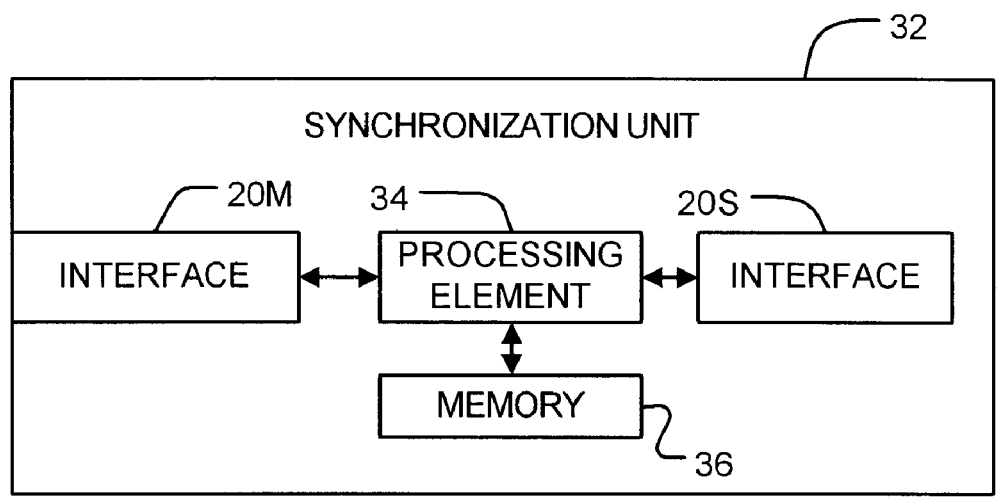
FIG. 3 is a block diagram illustrating a synchronization unit as may be used in the apparatus of FIG. 2.

As shown in FIG. 3, each synchronization unit 32 comprises at least two interfaces 20 which each connect to an embedded processing element 34. Processing element 34 executes firmware instructions stored in program memory 36. One interface 20M of synchronization unit 32 connects to bus 18 to be used as a timing master. The other interface(s) 20S connect to buses 18 that are to be used as timing slaves. Synchronization unit 32 determines the time offset and offset drift between the bus connected to each slave interface 20S and the bus 18 connected to its master interface 20M. Synchronization unit 32 forwards this information to any devices 14 connected to the bus 18 to which the slave interface 20S is connected.

FIG. 4 shows apparatus 30A which uses synchronization units 32 in another configuration. In apparatus 30A all of buses 18 are synchronized with the bus 21 which is shared between the master interfaces 20M of synchronization units 32. In the embodiment of FIG. 4 no data from any of devices 14 is transmitted on bus 21.

Figure 6:
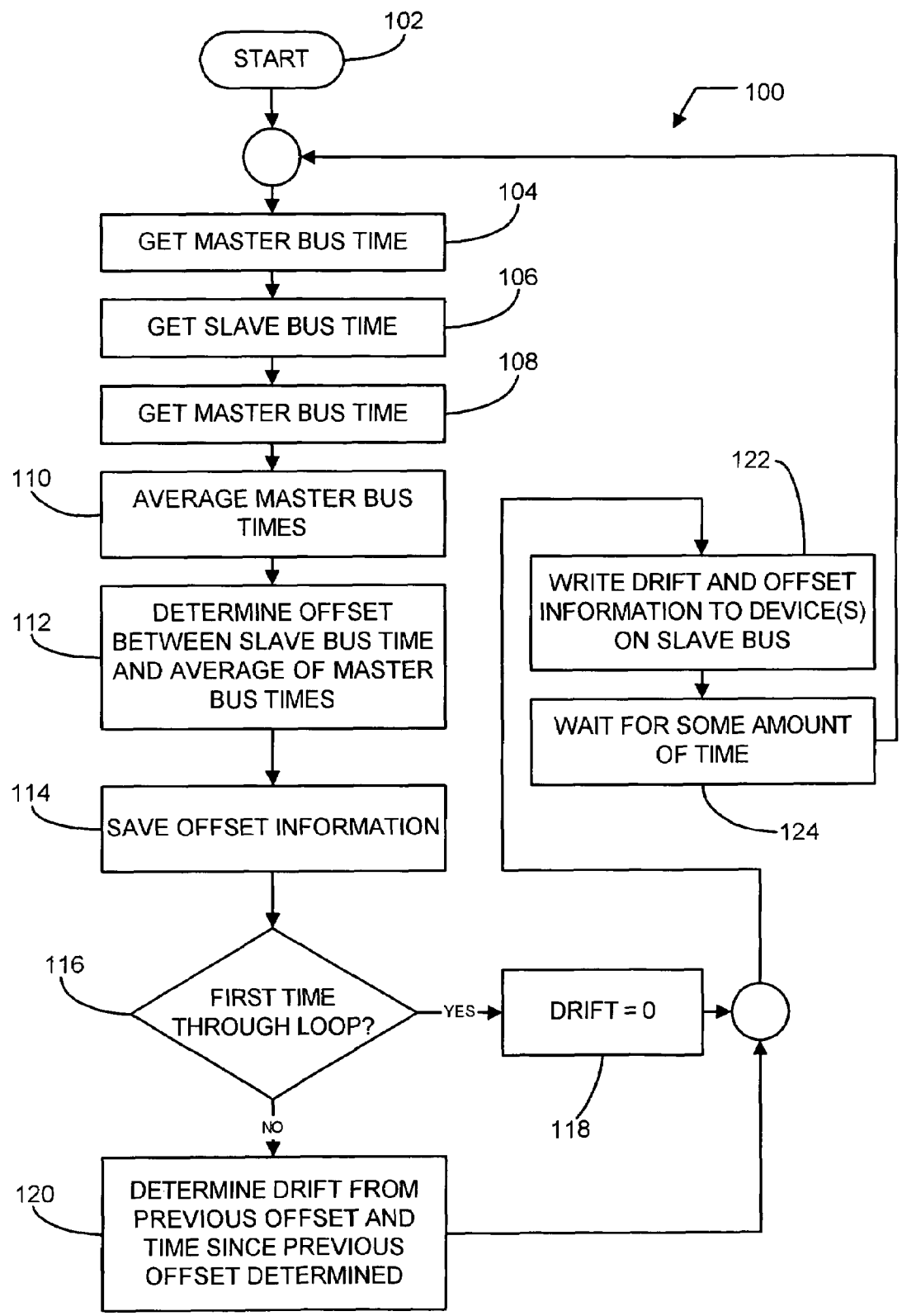
FIG. 6 is a flow chart which illustrates a method for determining a timing offset between two buses and generating a timing signal.

FIG. 6 illustrates steps in a method 100 for obtaining offset information and drift information and providing that information to devices 14 on one of the slave buses 18 according to the invention. It is to be understood that method 100 could be carried out simultaneously for any number of slave buses 18. After starting at block 102, method 100 proceeds to block 104, where timing information for master bus 18A is acquired. Next, the timing information for slave bus 18 is acquired at block 106, and then the timing information for master bus 18A is acquired again at block 108. At block 110 the average of the two values of timing information acquired from master bus 18A is calculated, and this average is compared to the value of the timing information for slave bus 18 at block 112 to determine a timing offset for slave bus 18. Averaging of the timing information for master bus 18A ensures that the timing offset for slave bus 18 will be accurate, since one value for master bus 18A is acquired before the value for slave bus 18 and the other value for master bus 18A is acquired after, thus compensating for any delays in getting the timing information from master bus 18A and slave bus 18. Once calculated, the timing offset for slave bus 18 is saved in program memory 24 at block 114.

At block 116, method 100 determines if it is on a first iteration of the loop (i.e., whether or not the timing offset has been calculated before). If method 100 is on its first iteration (i.e., no previous timing offset has been determined, block 116 yes output), method 100 proceeds to block 118 where the drift rate is set to 0. If method 100 is not on its first iteration (i.e., at least one previous timing offset has been determined, block 116 no output), method 100 proceeds to block 120 where the drift rate is determined based on the difference between the two most recently determined timing offsets and the time elapsed between their respective determinations.

Once the drift rate has been determined at block 120 (or set to 0 at block 118), method 100 proceeds to block 122, where the most recently determined timing offset and drift rate are broadcast to devices 14 on slave bus 18. Method 100 then waits for an amount of time at block 124. The amount of time spent waiting at block 124 may be predetermined based on the synchronization accuracy required for the particular application. The greater degree of accuracy required, the shorter the wait time at block 124. Alternatively, the amount of time spent waiting at block 124 may be determined based on the drift rate, with smaller drift rates leading to longer wait times, since the smaller the drift rate, the less frequently the synchronization timing information needs to be updated. After waiting at block 124, method 100 returns to block 104 and repeats. In some embodiments method 100 is configured to repeat approximately once per second.

The broadcast of offset information or offset information and drift rate information to each device 14 on a slave bus 18 permits those devices 14 to synchronize themselves with devices 14 on master bus 18A (or master bus 21 in the case of FIG. 4).

Figure 5:
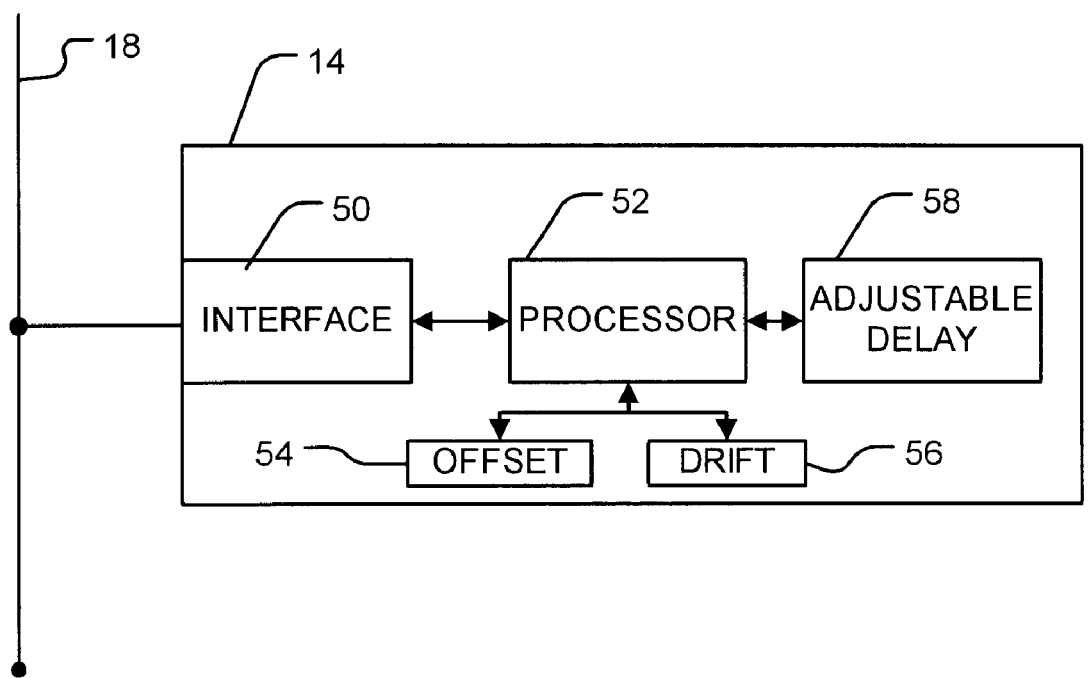
FIG. 5 is a block diagram of a device which uses offset and drift information according to the invention to keep in synchronization with other devices.

FIG. 5 is a block diagram of a device 14 which may be used in the invention. Device 14 comprises an interface 50 to a slave bus 18. A processing element 52 has access to storage locations 54 and 56. Processing element 52 receives timing offset information for slave bus 18 and timing drift rate information for slave bus 18 and saves these items of information in storage locations 54 and 56 respectively. Processing element 52 applies a rule to determine when certain events should occur relative to the timing of master bus 18. For example, a certain device 14 may operate according to a rule that requires it to commence a data acquisition cycle each time a clock associated with a master bus has a value which is an integer multiple of a certain number. To give a more specific example, suppose the master bus 18 has a clock frequency of 50 MHz and the device 14 is a digital video camera which operates at 50 frames per second. Such a device 14 may operate according to a rule which says that it should start a cycle for acquiring a frame each time the value of the bus clock is evenly divisible by 1,000,000. Of course, on buses 18 which transmit binary data, the devices 14 may operate according to a rule which says the cycles should start when the value of the bus clock is divisible a number expressed in binary form. Where several devices 14 all operate according to the same timing rule (or compatible rules) then their operation will remain synchronized.

Processing element 52 can determine whether an event is occurring at the correct time by using the current time on its slave bus 18 together with offset and drift rate information for the slave bus 18 relative to the master bus 18 to determine when the event is occurring relative to the time on the master bus 18.

When processing element 52 determines that one or more events in the operation of device 14 are occurring at times other than the desired times (in which case device 14 would not be operating synchronously with other devices 14 in which the events occur at the desired times) then processing element 52 controls an adjustable delay 58. Delay 58 alters a length of one or more operational cycles of device 14 or temporarily suspends operation of device 14 and thereby causes the events to occur at the desired times in future operational cycles.

Figure 7:
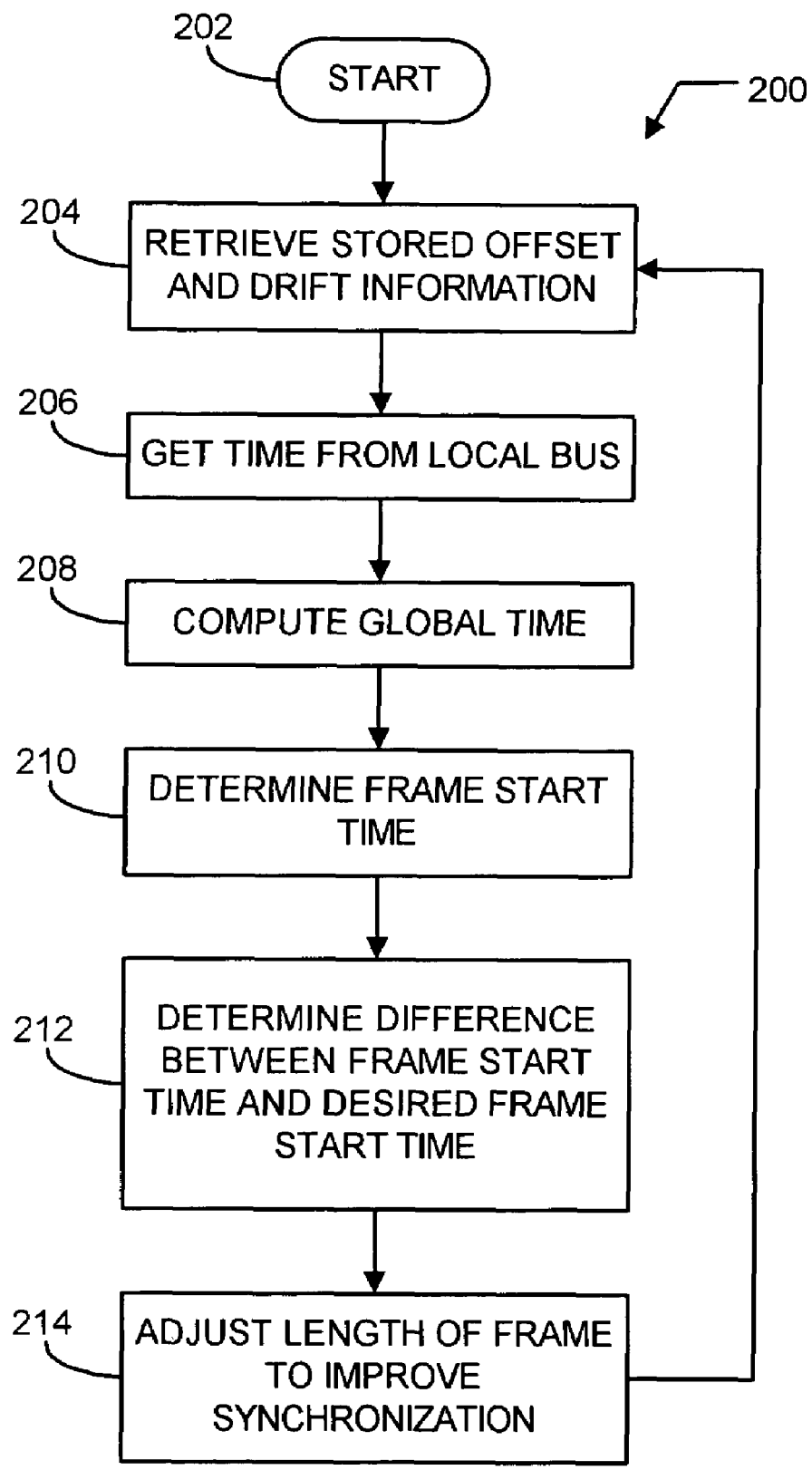
FIG. 7 is a flow chart illustrating a method which may be performed in a device attached to a bus for synchronizing operation of the device with operation of other devices using a timing signal; and, FIG. 8 is a block diagram illustrating a plurality of cameras connected for synchronization according to another embodiment of the invention.

FIG. 7 illustrates steps in a method 200 which may be implemented in a case where devices 14 comprise video cameras. Digital video cameras typically operate by sequentially acquiring images taken by an array of light detectors. The light detectors may be, for example, CCDs (charge coupled devices). Each image is acquired at the start of a frame. Data from the light detector array is then read out, typically row-by-row. The frame ends when the last data of the image has been read from the array. After one frame ends a new frame can start.

Method 200 may be carried out by a timing control system in each device 14 which is not on a bus selected as the "master" bus. After method 200 begins at block 202, device 14 receives timing offset and drift rate information from a synchronization unit 32 or data processor 16 at block 204. This information is maintained in a memory available to device 14. Each device 14 includes a processor which is configured (in software and/or hardware) to retrieve timing signals from the bus 18 to which the device is connected at block 206, and to compute a global time at block 208. The global time may be calculated based upon a local time, the time offset information and the drift rate information. The local time is a time indicated by the timing signals on the slave bus 18 to which the device is connected. For any devices 14 on the master bus 18 the global time is the same as the local time.

Once the global time is computed at block 208, device 14 applies the applicable rule to the global time to determine the next regularly scheduled frame start time at block 210. Where devices 14 include a number of cameras then it is generally desired to synchronize the cameras so that they all commence a new frame at the same global time. Since each frame should take the same amount of time (the frame time) to complete, the desired start time for frames can be expressed in the global time as a starting time, to, plus a discrete multiple of the ideal frame time. At block 212, device 14 determines the difference (if any) between its next regularly scheduled frame start time and the next desired frame start time. If block 214 determines that there is a difference in the start times, device 14 adjusts its frame length so that the next frame starts at the next desired frame start time.

One way to maintain a camera in synchronization with other cameras is to make adjustments to the time the camera takes to complete a current frame (the "frame length") to cause new frames start at the desired start times. A convenient way to vary a frame length in a camera is to vary an amount of data read out from a light-sensing array in the camera. The array of light-sensing elements in a video camera is typically somewhat larger than the size of the images to be produced. For example, a 660×494 CCD array might be used in a camera which is intended to produce an image having dimensions of 640 pixels by 480 pixels.

It is convenient to create a situation which permits a simple adjustment to the frame length by reading a selected amount of non-critical data from a light-sensing array. Since some time is taken to read each piece of data, a current frame can be extended by reading more unnecessary date, thereby delaying the time at which a next frame commences. Conversely, a current frame can be made to finish earlier by reducing an amount of unnecessary data which is read, thereby permitting the next frame to begin sooner. For example, a camera may be configured so that one or more non-critical lines are read at some point during each frame. These lines, which are called extra lines herein, may be lines which are outside of the image area. The extra lines may, for example, be read at the start of each frame. Timing adjustments may also, or in the alternative, be performed on a line-by-line basis by reading one or more non-essential pixels in one or more lines of the array which do contain data from the image area. Data which is read from the array which is not required as part of the image is called extra data herein.

One way to adjust the timing of a video camera is to vary the amount of time taken to read extra data from the array. The time taken to read data for an image from the array can be increased by reading more extra data. The amount of the increase depends upon how much extra data is read during the frame. Based on the difference between the global time at which a frame actually started (as determined from the local time, offset information and drift rate information) and the desired global time for the start of the frame, (or for some event which occurs during a frame such as commencing reading a line of data from a light sensing array), the processor in the device can shorten or lengthen the time spent in reading extra data appropriately to cause the start of the next frame (or the intermediate event) to occur at the desired time (or at least closer to the desired time). In some embodiments, reading extra data could comprise an additional, redundant, reading of image data.

Device 14 may determine the difference between the actual time at which a frame starts and the desired time at which the frame should have started. This difference may be determined for every frame but could also be determined periodically or, less preferably, sporadically. If this difference indicates that the frame started too soon then the start of the next frame can be delayed by an appropriate amount, for example, by reading more extra data. This may include reading extra data from one or more of the extra lines, reading extra data from one or more lines which also contain image data, or both. If the difference indicates that the frame started too late then the start of the next frame can be moved up by a suitable amount, for example by reading off less data from one or more of the extra lines. Since data is typically clocked off from a row of an array of light detectors (such as a CCD array) as if the row were a shift register, the number of pixels to be clocked off can be specified. This number sets the amount of time that reading data from the line will take.

Where drift rate information is provided the device 14 can stay in close synchronization with other devices 14 even if the offset information and drift rate information are updated relatively infrequently.

Figure 8:
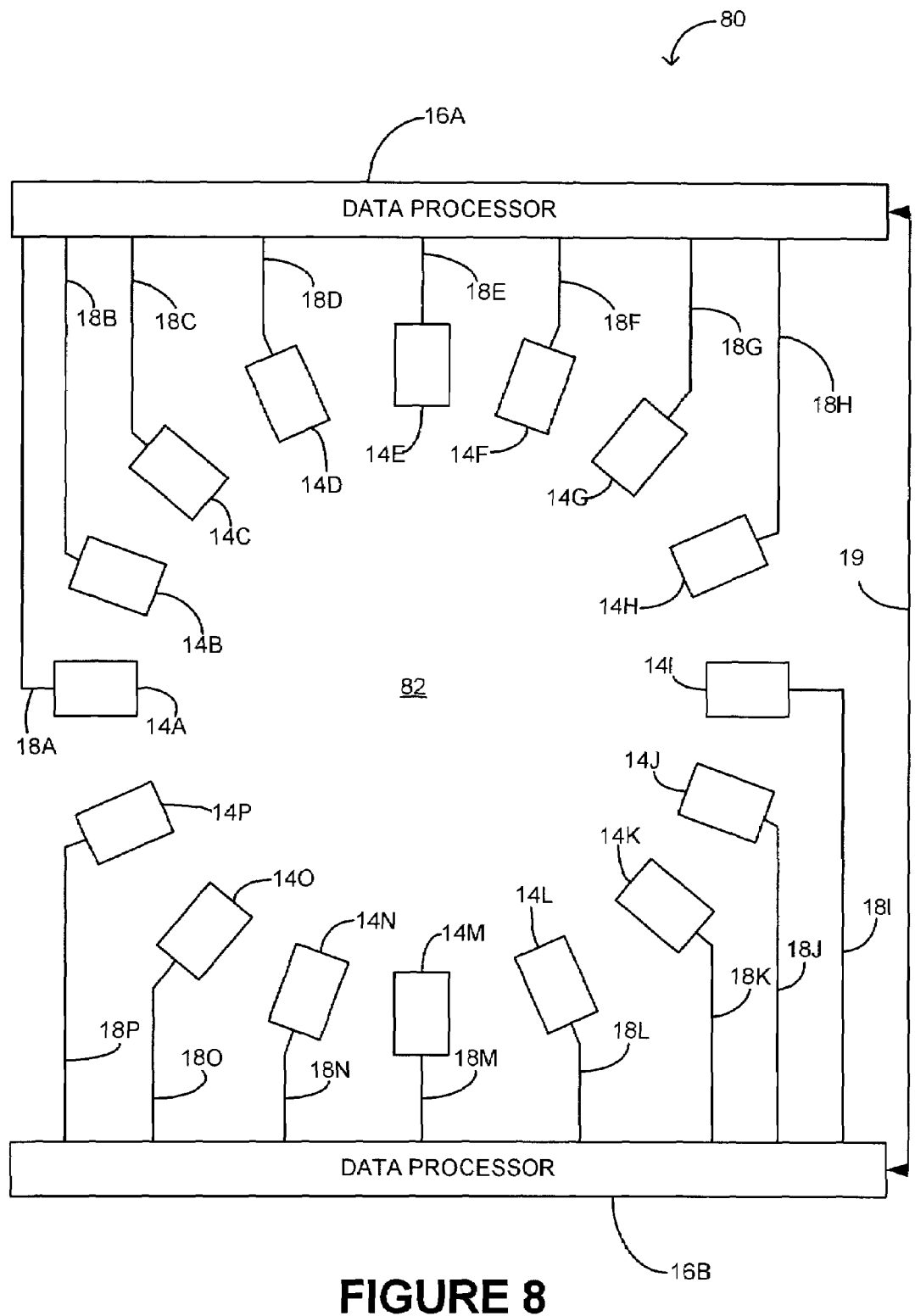

FIG. 8 illustrates apparatus 80 according to another embodiment of the invention. Components of apparatus 80 which are common with apparatus 10 and 30 are given the same reference numerals. Apparatus 80 comprises devices 14A-P, each of which preferably comprises a camera. The cameras are all positioned to record images of image area 82. Devices 14A-H are coupled to data processor 16A by buses 18A-H, respectively, and devices 14I-P are coupled to data processor 16B by buses 18I-P, respectively. Interfaces 20 are not shown in FIG. 8. Data processors 16A and 16B are interconnected by network connection 19. The embodiment of FIG. 8 allows all of the cameras to record frames in a synchronized fashion, which is desirable for certain special effects applications.

Certain implementations of the invention comprise computer processors which execute software instructions which cause the processors to perform a method of the invention. For example, one or more processors in a data processor 16 or synchronization unit 32 may implement the methods of FIG. 6 by executing software instructions in a program memory accessible to the processor(s). The invention may also be provided in the form of a program product. The program product may comprise any medium which carries a set of computer-readable signals comprising instructions which, when executed by a computer processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

Methods according to the invention may be implemented using hardware logic circuits instead of, or in addition to, data processors which execute software instructions. For example, a synchronization unit 32 may comprise an ASIC (application specific integrated circuit) or FPGA (field programmable gate array) which incorporates logic circuits which implements a method according to the invention. The term "processor" herein includes such hardware logic circuits.

As an alternative to reading extra lines from an array of CCDs or other light-sensitive devices, a software controlled delay may be introduced to adjust the frame time or a time between frames to achieve synchronization. The software controlled delay may be generated by a hardware timer or by a timer implemented in software in the device. The software-controlled delay may comprise varying a speed of a clock or waiting out a number of clock cycles.

While FIG. 6 illustrates a method which involves reading a slave bus time between two readings of a master bus time, other sequences of time readings could be made to obtain an offset between the master bus time and the slave bus time. For example, the master bus time could be read between two readings of the slave bus time.

Using one bus as a master for timing reference purposes is merely a matter of convenience. In practice devices on a plurality of buses could all be synchronized relative to another clock which serves as a master clock. Alternatively, all of the devices could be synchronized relative to an average of the clocks of the individual buses.

Accordingly, the scope of the invention is to be construed in accordance with the substance defined by the following claims.

What is claimed is:

1. A method of synchronizing one or more devices on a first bus, the first bus associated with a first clock for generating first bus timing information for the first bus with one or more devices on a second bus, the second bus associated with a second clock for generating second bus timing information for the second bus, each of the devices having an individually adjustable timing, the method comprising:

acquiring the first bus timing information and the second bus timing information from the first bus and the second bus respectively;
   determining a timing offset between the first bus and the second bus; and,
   broadcasting the timing offset to the one or more devices on the second bus; and,
   adjusting the timing of the one or more devices on the second bus to be synchronized with the one or more devices on the first bus based upon the broadcast timing offset and the second bus timing information wherein the one or more devices on the second bus comprise cameras and the cameras adjust their timing by selectively reading an adjustable amount of extra data from a light-sensing array for each frame.

2. A method according to claim 1 comprising calculating a drift rate of the timing offset and broadcasting the drift rate to the one or more devices on the second bus and adjusting the timing of the one or more devices on the second bus to be synchronized with the one or more devices on the first bus based on the timing offset and the drift rate and the second bus timing information.

3. A method according to claim 2 wherein calculating the drift rate comprises calculating a first order time derivative of the timing offset.

4. A method according to claim 3 wherein calculating the drift rate comprises calculating a second order time derivative of the timing offset.

5. A method according to claim 1 wherein the one or more devices on the first and second buses are each configured to begin an operational cycle according to a rule based on timing information of the first bus.

6. A method according to claim 5 wherein the one or more devices on the second bus adjust their timing by determining timing information of the first bus by applying the timing offset to the timing information of the second bus.

7. A method according to claim 1 wherein the one or more devices on the second bus adjust their timing by adjustably controlling a delay to alter a length of an operational cycle.

8. A method according to claim 1 wherein the first and second buses comprise serial buses.

9. A method according to claim 1 wherein the first and second buses comprise USB buses.

10. A method according to claim 1 wherein the first and second buses comprise different types of buses.

11. A method according to claim 1 comprising automatically broadcasting timing information on the first and second buses.

12. A method according to claim 1 wherein the method is carried out on a data processor comprising first and second interfaces coupled to the first and second buses, respectively, and wherein acquiring timing information from the first bus and the second bus comprises querying the first and second interfaces for the timing information.

13. A method according to claim 1 wherein broadcasting the timing offset to the one or more devices on the second bus is carried out on a synchronization unit coupled between the first and second buses, and wherein acquiring timing information from the first bus and the second bus comprises receiving timing information from the first and second clocks at the synchronization unit.

14. A method of synchronizing one or more devices on a first bus, the first bus associated with a first clock for generating first bus timing information for the first bus with one or more devices on a second bus, the second bus associated with a second clock for generating second bus timing information for the second bus, each of the devices having an individually adjustable timing, the method comprising:

providing a master bus on which a global time is broadcast by a master clock;
   acquiring the first bus timing information and the second bus timing information from the first bus and the second bus respectively;
   determining a first timing offset between the first bus and the master bus;
   determining a second timing offset between the second bus and the master bus; and,
   broadcasting the first timing offset to the one or more devices on the first bus and broadcasting the second timing offset to the one or more devices on the second bus; and,
   adjusting the timing of the one or more devices on the first bus based upon the first timing offset and the first bus timing information and adjusting the timing of the one or more devices on the second bus based upon the second timing offset and the second bus timing information so that the one or more devices on the first bus and the one or more devices on the second bus all begin their respective operational cycles at the same global time wherein the one or more devices on the second bus comprise cameras and the cameras adjust their timing by selectively reading an adjustable amount of extra data from a light-sensing array for each frame.

15. A method according to claim 14 wherein the one or more devices on the first and second buses are each configured to begin an operational cycle according to a rule based on the global time.

16. An apparatus for synchronizing one or more devices on a first bus, the first bus associated with a first clock for generating first bus timing information for the first bus with one or more devices on a second bus, the second bus associated with a second clock for generating second bus timing information for the second bus, each of the devices having an individually adjustable timing, the apparatus comprising:

a first interface coupled to the first bus;
   a second interface coupled to the second bus;
   a processing element coupled to the first and second buses by the first and second interfaces respectively to receive the timing information for the first and second buses;
   a program memory coupled to the processing element, the program memory containing software instructions programmed to cause the processing element to calculate a timing offset between the first bus and the second bus and broadcast the timing offset to the one or more devices on the second bus by means of the second interface; and, a timing control system in each of the one or more devices on the second bus, the timing control systems each configured to adjust a timing of a corresponding one of the devices based upon the second bus timing information and the timing offset wherein the one or more devices on the second bus comprise cameras and the cameras adjust their timing by selectively reading an adjustable amount of extra data from a light-sensing array for each frame.

17. An apparatus according to claim 16 wherein the one or more devices on the first and second buses are each configured to begin an operational cycle according to a rule based on timing information of the first bus.

18. An apparatus according to claim 17 wherein the one or more devices on the second bus are configured to adjust their timing by determining timing information of the first bus by applying the timing offset to the timing information of the second bus.

19. An apparatus according to claim 16 wherein a bandwidth of the one or more devices on the first bus plus a bandwidth of the one or more devices on the second bus exceeds a maximum allowable bandwidth of either of the first or second buses.

20. An apparatus according to claim 16 wherein the first and second interfaces, the processing element and the program memory are all located within a data processor configured to process data received from the one or more devices on the first bus and the one or more devices on the second bus.

21. An apparatus according to claim 16 wherein the first interface, the processing element and the program memory are all located within a first data processor configured to process data received from the one or more devices on the first bus and the second interface is located within a second data processor configured to process data received from the one or more devices on the second bus, and wherein the first and second data processors are connected by a network connection.

22. An apparatus according to claim 16 wherein the first and second interfaces, the processing element and the program memory are all located within a synchronization unit coupled between the first and second buses.

23. An apparatus according to claim 16 wherein the one or more devices on the first bus comprise a first plurality of cameras, and the one or more cameras on the second bus comprise a second plurality of cameras, and wherein all of the first and second pluralities of cameras are positioned to record images of an image area.

24. A method according to claim 1 comprising simultaneously broadcasting the timing offset to a plurality of devices on the second bus and individually regulating a timing of each of the plurality of devices on the second bus based at least in part upon the timing offset.

25. A method according to claim 14 comprising simultaneously broadcasting the timing offset to a plurality of devices on the second bus and regulating a timing of each of the plurality of devices on the second bus based at least in part upon the timing offset.

26. An apparatus according to claim 16 comprising a plurality of devices on the second bus wherein each of the devices on the second bus is configured to regulate its timing based at least in part upon the timing offset and timing information from the second bus.

* * * * *